(12) United States Patent
Wheeler et al.

(10) Patent No.: US 10,308,225 B2
(45) Date of Patent: Jun. 4, 2019

(54) ACCELEROMETER-BASED VEHICLE WIPER BLADE MONITORING

(71) Applicant: Ford Global Technologies, LLC, Dearborn, MI (US)

(72) Inventors: Joshua Wheeler, Trenton, MI (US); Scott Amman, Milford, MI (US); Doug B. Thornburg, Dearborn, MI (US); Brian Bennie, Sterling Heights, MI (US); Mahmoud Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/683,529

(22) Filed: Aug. 22, 2017

(65) Prior Publication Data
US 2019/0061697 A1  Feb. 28, 2019

(51) Int. Cl.
*B60S 1/08* (2006.01)

(52) U.S. Cl.
CPC ........... *B60S 1/0822* (2013.01); *B60S 1/0859* (2013.01)

(58) Field of Classification Search
CPC .............................. B60S 1/0822; B60S 1/0859
USPC ......................................................... 318/460
See application file for complete search history.

(56) References Cited

U.S. PATENT DOCUMENTS

| | | | |
|---|---|---|---|
| 5,748,075 A | 5/1998 | Dirmeyer et al. | |
| 6,057,660 A | 5/2000 | Meier et al. | |
| 6,732,566 B2 | 5/2004 | Roelleke et al. | |
| 6,889,189 B2 | 5/2005 | Boman | |
| 7,016,836 B1 | 3/2006 | Yoda | |
| 7,149,318 B2 | 12/2006 | Bank et al. | |
| 7,697,698 B2 | 4/2010 | Brown | |
| 7,853,026 B2 | 12/2010 | DeLine et al. | |
| 8,077,022 B2 | 12/2011 | Baruco et al. | |
| 8,165,875 B2 | 4/2012 | Hetherington et al. | |
| 8,515,095 B2 | 8/2013 | Bard | |
| 8,724,832 B2 | 5/2014 | Stephanou et al. | |
| 8,849,656 B2 | 9/2014 | Schmidt et al. | |
| 8,996,383 B2 | 3/2015 | Rodemer | |
| 9,014,392 B2 | 4/2015 | Sato et al. | |

(Continued)

FOREIGN PATENT DOCUMENTS

| | | |
|---|---|---|
| CN | 104405272 B | 1/2016 |
| CN | 103770736 B | 12/2016 |

(Continued)

OTHER PUBLICATIONS

Benson, K. Blair et al. Standard handbook of Audio and Radio Engineering. McGraw-Hill, 2002, p. 1-10.

(Continued)

*Primary Examiner* — Rina Duda
*Assistant Examiner* — Devon Joseph
(74) *Attorney, Agent, or Firm* — James P. Muraff; Neal, Gerber & Eisenberg LLP

(57) ABSTRACT

Method and apparatus are disclosed for accelerometer-based windshield wiper monitoring. A vehicle includes an accelerometer affixed to a vehicle window, a windshield wiper to actuate across the vehicle window, and a processor. The processor is configured to determine an acoustic profile corresponding to the windshield wiper based on structure-borne audio data received from the accelerometer, determine whether a bandlimited decibel level of the acoustic profile exceeds a threshold, and responsively provide an alert via a vehicle display.

20 Claims, 4 Drawing Sheets

(56) References Cited

U.S. PATENT DOCUMENTS

| | | | |
|---|---|---|---|
| 9,020,690 B2 | 4/2015 | McKown et al. | |
| 9,124,219 B2 | 9/2015 | Thormundsson | |
| 9,154,893 B1 | 10/2015 | Breed | |
| 9,263,040 B2 | 2/2016 | Tzirkel-Hancock et al. | |
| 9,330,684 B1 | 5/2016 | Kirsch | |
| 9,469,247 B2 | 10/2016 | Juneja et al. | |
| 9,539,984 B2 | 1/2017 | Dias | |
| 9,870,697 B2 | 1/2018 | Frew | |
| 2005/0071159 A1 | 3/2005 | Boman et al. | |
| 2005/0074131 A1 | 4/2005 | McCall et al. | |
| 2006/0184361 A1 | 8/2006 | Lieb | |
| 2008/0175405 A1 | 7/2008 | Couvillon | |
| 2008/0273711 A1 | 11/2008 | Broussard et al. | |
| 2009/0125311 A1 | 5/2009 | Haulick et al. | |
| 2012/0299718 A1 | 11/2012 | Yoshino | |
| 2013/0188794 A1 | 7/2013 | Kawamata | |
| 2013/0308784 A1 | 11/2013 | Dickens et al. | |
| 2015/0117155 A1 | 4/2015 | Jang et al. | |
| 2015/0139428 A1 | 5/2015 | Reining | |
| 2015/0156587 A1 | 6/2015 | Herbig et al. | |
| 2015/0365743 A1 | 12/2015 | Koningsberg et al. | |
| 2016/0119890 A1 | 1/2016 | Amman et al. | |
| 2016/0217689 A1 | 7/2016 | Young et al. | |
| 2016/0299011 A1 | 10/2016 | Lhle | |
| 2016/0355125 A1 | 12/2016 | Herbert | |
| 2017/0018127 A1 | 1/2017 | Yang et al. | |
| 2017/0088072 A1 | 3/2017 | Curtis | |
| 2017/0118556 A1 | 4/2017 | Macours | |

FOREIGN PATENT DOCUMENTS

| | | |
|---|---|---|
| CN | 106341755 | 1/2017 |
| DE | 10164509 A1 | 7/2003 |
| DE | 10254684 A1 | 6/2004 |
| DE | 102009046132 A1 | 5/2011 |
| DE | 102011003730 A1 | 7/2011 |
| EP | 1078818 | 2/2001 |
| FR | 2825882 B1 | 12/2002 |
| JP | 3802897 B2 | 5/2006 |
| JP | 2010000963 A | 1/2010 |
| KR | 1020160150554 B1 | 6/1998 |
| KR | 101018783 B1 | 3/2011 |
| WO | WO 1998047109 A1 | 10/1998 |
| WO | WO 2013/90007 A1 | 6/2013 |

OTHER PUBLICATIONS

Christian Bolzmacher et al., Transforming Car Glass Into Microphones Using Piezoelectric Transducers, Microsystem Technologies, Jul. 2016, vol. 22, Issue 7, 3 pages.

Piezo Acoustics: Turning, Windows into Invisible Speakers and Helping James Bond Keep Secrets, 4 pages.

Karen M., Stickable Sound Pads Turn Any Surface Into a Speaker, Jul. 30, 2008, 4 pages.

Search Report dated Apr. 3, 2018 for Great Britain Patent Application No. GB 1716042.5 (3 Pages).

ACCELEROMETER-BASED VEHICLE WIPER BLADE MONITORING

TECHNICAL FIELD

The present disclosure generally relates to vehicle component monitoring and, more specifically, accelerometer-based monitoring of wiper blades.

BACKGROUND

Increasingly, with customer experience in mind, vehicles are being manufactured with sensors, devices, and systems that warn the driver when various parts of the car require maintenance or are nearing the end of their useful life. This helps keep the vehicle up-to-date and well maintained, by warning the driver when parts should be replaced or when the vehicle should be taken in for repairs.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for accelerometer-based vehicle wiper blade monitoring. A vehicle includes an accelerometer affixed to a vehicle window, a windshield wiper to actuate across the vehicle window, and a processor. The processor is configured to determine an acoustic profile corresponding to the windshield wiper based on structure-borne audio data received from the accelerometer, determine whether a bandlimited decibel level of the acoustic profile exceeds a threshold, and responsively provide an alert via a vehicle display.

An example method includes receiving, by a processor, structure-borne audio data captured by an accelerometer affixed to a vehicle window, wherein the audio data corresponds to noise generated when a windshield wiper is actuated across the vehicle window. The method also includes determining an acoustic profile corresponding to the received audio data. The method further includes determining whether a bandlimited decibel level of the acoustic profile exceeds a threshold. And the method yet further includes responsively providing an alert via a vehicle display.

Another example includes means for receiving, by a processor, structure-borne audio data captured by an accelerometer affixed to a vehicle window, wherein the audio data corresponds to noise generated when a windshield wiper is actuated across the vehicle window. The example also includes means for determining an acoustic profile corresponding to the received audio data. The example further includes means for determining whether a bandlimited decibel level of the acoustic profile exceeds a threshold. And the example still further includes means for responsively providing an alert via a vehicle display.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
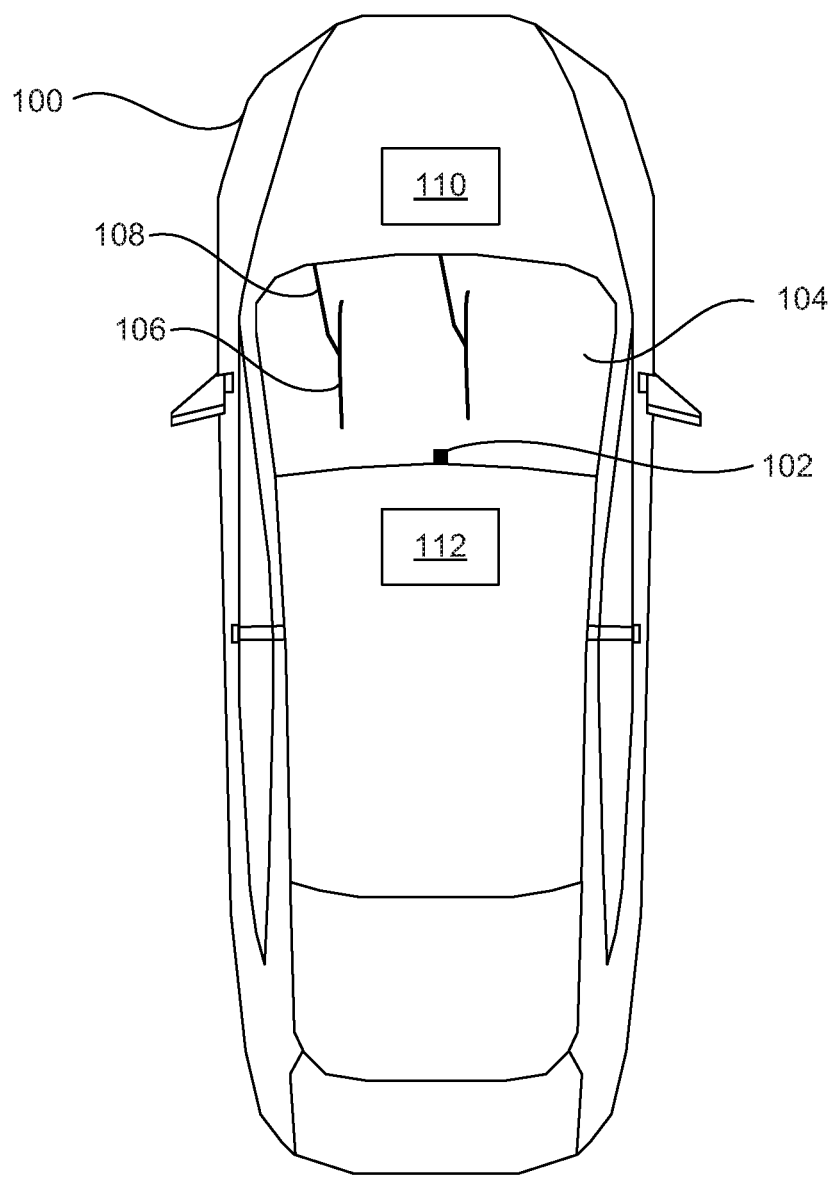
FIG. 1 illustrates a vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles are being designed and manufactured with the intent of warning the driver when one or more components, parts, or systems is approaching or beyond its useful life. For instance oil monitoring systems review the engine operating conditions and miles driven to alert the driver when it is time to change the oil. In addition, tire air pressure sensors alert the driver when a vehicle tire is running low, battery sensors alert the driver when the battery is becoming aged, and various other sensors, systems, and devices may monitor one or more characteristics of the vehicle.

Vehicle windshield wipers generally are used to clear rain, dirt, and other objects form the driver's field of view. Over the course of time, the effectiveness of a given wiper blade may degrade, resulting in streaks, missed objects, and otherwise ineffective clearing of the windshield. This can result in less driver visibility and increase safety concerns.

Often times as a wiper blade degrades over time, an audible squeal can be heard as the blade actuates across the windshield. This can be due to imperfections in the blade, materials that become stuck to or caked onto the blade, or for another reason. Examples of the present disclosure make use of this audible squeal by capturing the noise with an accelerometer positioned on the windshield. The sound from the wiper actuating is captured by the accelerometer, analyzed, and an acoustic profile is determined. The acoustic profile may then be compared to one or more stored profiles, and an alert can be generated indicating that the wiper blade or wiper system should be checked or replaced.

In order to achieve these and other benefits, examples disclosed herein may include placing one or more accelerometers on a windshield of the vehicle. The accelerometer(s) may be configured to detect and measure vibrations of the windshield, also known as "structure-borne" sounds that propagate along the window. An accelerometer may be used instead of a traditional microphone to capture the sound, because a traditional microphone may experience problems due to weather, dirt, sand, or other objects affecting the microphone diaphragm.

When the wiper blade is actuated across the windshield, the audible squeal may be detected and measured by the accelerometer. This detected noise may be used to determine an acoustic profile of the wiper blade. For instance, a processor coupled to the accelerometer may focus on sound between 1-10 kHz (i.e., a bandlimited signal). If the bandlimited acoustic profile decibel level exceeds a threshold, that may indicate that the wiper blade is too loud, and that the wiper blade must be checked or replaced. An alert indicating as such may then be generated. In some cases, the alert may be displayed to the driver. Alternatively, the alert may be sent to a vehicle service center or cloud based computing system, to alert the service center or a central computing system that the wiper blade and/or arm requires service.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a power train with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an accelerometer 102 affixed to a window 104, a windshield wiper 106 attached to a wiper arm 108, a processor 110, and a vehicle display 112.

Accelerometer 102 may be any type of accelerometer that (a) measures the vibrations perpendicular to the plane of glass of the corresponding window to which it is affixed and (b) measures a wide frequency range (e.g., the frequency range of audible sound, etc.), including uniaxial or triaxial accelerometers, micromachined or piezoelectric accelerometers, etc. The measured vibrations may be termed "structure-borne" audio data (as opposed to airborne audio data." Accelerometer 102 may be rigidly mounted on a corresponding window 104 on the interior of the cabin of the vehicle 100. In some example, accelerometer 102 is mounted on window 104 in a manner as to not obstruct the view of the driver. For example, accelerometer 102 may be affixed to a central portion of the windshield, proximate the rear-view mirror. Accelerometer 102 may be wired or wirelessly connected to processor 110, so as to transmit information, data, or signals including the detected vibrations.

The examples disclosed herein may focus on a front windshield and front windshield wiper, however it should be understood that the concepts and descriptions may also apply to wiper blades configured to actuate across the rear window of the vehicle as well.

Window 104 may be a front windshield of vehicle 100. In some examples window 104 may be a rear window, a side window, a sunroof, or any other glass surface on which a wiper blade may operate. Window 014 may be made of laminated glass (sometimes referred to as "safety glass") or may be made of non-laminated tempered glass. The glass of window 104 vibrates when struck by sound waves, including sound waves generated by the wiper 106 actuating across the window.

Wiper 106 may be any wiper blade configured to operate on a vehicle. As such, varying makes, models, sizes, shapes, and other styles of wiper blades may be used that the type shown in FIG. 1. Wiper 106 may include one or more sections, and may be curved so as to match the contour of window 104. Further, wiper 106 may be configured to actuate across window 104 to clear away rain, snow, dirt, or other materials.

In order to actuate across window 104, wiper 106 may be attached to a wiper arm 108, which may be controlled by a motor. As the wiper 106 slides across window 104, the interaction between the blade and the window may emit an audible noise or squeal. One or more characteristics of the squeal may be correlated to an age or efficiency of wiper blade 106, wiper arm 108, or one or more other components of vehicle 100. For instance, a brand new wiper blade actuated across the window may emit a first audible squeal having a first frequency profile. The same wiper, when aged, may emit a louder squeal having the same or similar frequency profile, or may have a changed frequency profile. The difference may be determined by processor 110, and used to provide an alert via display 112.

Processor 110 may be configured to receive structure-borne audio data from accelerometer 102, and to determine an acoustic profile of the data corresponding to the windshield wiper. The acoustic profile may include the varying noise levels (decibels) of the data at various frequencies. For instance, a given wiper blade when actuated may cause a squeal with a peak noise at around 2.5 kHz, along with components at various other frequencies. Two example structure-borne audio signals are described below with respect to FIG. 3.

Determining the acoustic profile may include determining one or more acoustic characteristics of the received data, including frequencies, decibel levels, sound pressure levels, magnitudes or amplitudes of various aspects of the signals, and/or processing the data in one or more ways, such as by filtering the data for example.

In some examples, processor 110 may then be configured to compare the determined acoustic profile to a plurality of stored acoustic profiles. For instance, the processor may have access to a plurality of stored acoustic profiles corresponding to varying situations, such as a new wiper blade, aged wiper blade, broken wiper arm, and more. Each profile may correspond to a unique audio signal shape, and the processor may compare a shape of the audio signal received from accelerometer 102 to the plurality of stored shapes, to determine which stored acoustic profile is the closest match. Each stored acoustic profile may also have a corresponding threshold decibel level. The threshold corresponding to the matching acoustic profile may then be used by processor 110 for one or more purposes. Further, each stored acoustic profile may have a corresponding alert type, which may be related to the type of issue associated with the profile (e.g., broken wiper blade, broken arm, aged blade, etc.).

After determining the acoustic profile of the received audio data, processor 110 may be configured to determine whether a bandlimited decibel level of the acoustic profile exceeds a threshold. The acoustic profile may be bandlimited to between 1 and 10 kHz, and the processor may be configured to determine whether any part of the acoustic profile in this range has a decibel level greater than a given threshold.

Processor 110 may then be configured to responsively provide an alert via vehicle display 112. The alert may indicate that the wiper blade is damages, aged, needs to be checked, or needs to be replaced, for example. Other alerts are possible as well. In some example, the alert may be a visual alert on display 112. Alternatively or in addition, the alert may include an audio or haptic component, such as a beep or buzz. In still other examples, the alert may be generated and transmitted to a central computing system, or a service center. This may occur in situations where the vehicle does not include a display (e.g., as is the case in some autonomous vehicles) or is not set up to provide alerts to the driver. As such, an alert may be sent to a service center or other computing system to alert the responsible parties.

In some examples the content of the alert may correspond to the closest matching stored acoustic profile. For instance, the closest matching stored acoustic profile may correspond to an aged wiper blade. The alert in that case may indicate that the wiper blade is aged. Alternatively, the closest matching stored acoustic profile may correspond to a broken wire blade arm. In that case, the alert may indicate that the wiper blade arm must be checked or replaced. Other alerts are possible as well.

In some examples the processor may further be configured to receive input indicating a characteristic of the windshield wiper, and modify the threshold based on the received input. In practice, this may include receiving input via a vehicle interface (such as a touch screen or control panel) indicating the make, model, manufacturer, size, material, or other characteristic of the windshield wiper. Then based on this input information, the processor may adjust or modify the threshold used in determining whether a decibel level is greater or lower than the threshold. Some types of wiper blades may be quieter or louder than others (even when brand new), such that the threshold used by processor 110 may be modified to properly reflect the type of wiper blade.

Figure 2:
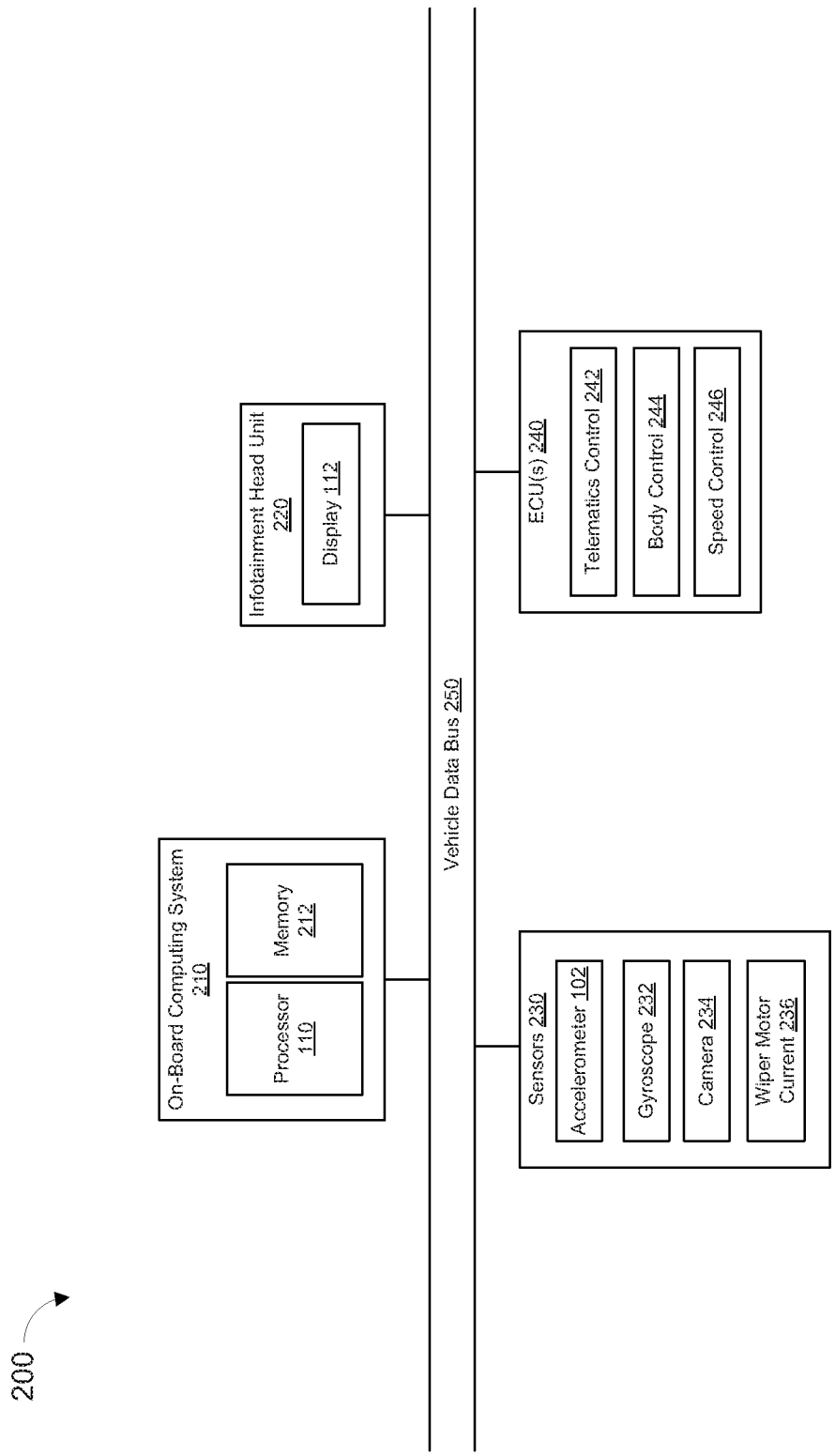
FIG. 2 is a block diagram of electronic components of the vehicle of FIG. 1.

In some examples vehicle 100 may include one or more other sensors, such as those described with respect to FIG. 2. Information from these sensors may be used to corroborate data received from accelerometer 102, and to ultimately display the alert based on data from both the accelerometer and one or more other sensors. For instance, sensors such as a camera, rain sensor, or other sensor may be used to determine and corroborate weather conditions, wiper blade movement, wiper arm condition, and more. Further, one or more sensors may be configured to measure bumps and variations in the position of the window 104 and accelerometer 102 to account for bumps in the road and the movement of the vehicle (which may inadvertently be detected by accelerometer 102). Other sensors may be used as well.

FIG. 2 illustrates an example block diagram 200 showing electronic components of vehicle 100, according to some embodiments. In the illustrated example, the electronic components 200 include an on-board computing system 210, infotainment head unit 220, sensors 230, electronic control unit(s) 240, and vehicle data bus 250.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 112. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display of vehicle 100.

Sensors 230 may be arranged in and around the vehicle 100 in any suitable fashion, and may be configured to determine one or more characteristics of vehicle 100. For example, accelerometer 102 may measure the structure-borne sound from the wiper blade actuating across the windshield. Gyroscope 232 may measure a pitch, roll, yaw, or other change in vehicle 100, and camera 234 may be configured to capture and transmit images to be processed and/or displayed by vehicle 100. The wiper motor current sensor 236 may be configured to detect an amount of current drawn by the wiper motor. The amount of current may correspond to the mechanical effort required to move the wiper blade across the windshield. As such, an older wiper blade may require more mechanical effort (and thus more current) than a new wiper blade. Data from the wiper motor current sensor may be used to corroborate an acoustic profile, threshold, or other aspect such as those described in this disclosure. Other sensors may be included as well, such as noise detection sensors, air flow sensors, and more.

The ECUs 240 may monitor and control subsystems of vehicle 100. ECUs 240 may communicate and exchange information via vehicle data bus 250. Additionally, ECUs 240 may communicate properties (such as, status of the ECU 240, sensor readings, control state, error and diagnostic codes, etc.) to and/or receive requests from other ECUs 240. Some vehicles 100 may have seventy or more ECUs 240 located in various locations around the vehicle 100 communicatively coupled by vehicle data bus 250. ECUs 240 may be discrete sets of electronics that include their own circuit(s) (such as integrated circuits, microprocessors, memory, storage, etc.) and firmware, sensors, actuators, and/or mounting hardware. In the illustrated example, ECUs 240 may include the telematics control unit 242, the body control unit 244, and the speed control unit 246.

The telematics control unit 242 may control tracking of the vehicle 100, for example, using data received by a GPS receiver, communication module, and/or one or more sensors. The body control unit 244 may control various subsystems of the vehicle 100. For example, the body control unit 244 may control power a trunk latch, windows, power locks, power moon roof control, an immobilizer system, and/or power mirrors, etc. The speed control unit 246 may control the speed of vehicle 100, via control of the brakes, drive train, and/or one or more other systems or devices. Other ECUs are possible as well.

Vehicle data bus 250 may include one or more data buses that communicatively couple the on-board computing system 210, infotainment head unit 220, sensors 230, ECUs 240, and other devices or systems connected to the vehicle data bus 250. In some examples, vehicle data bus 250 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3:
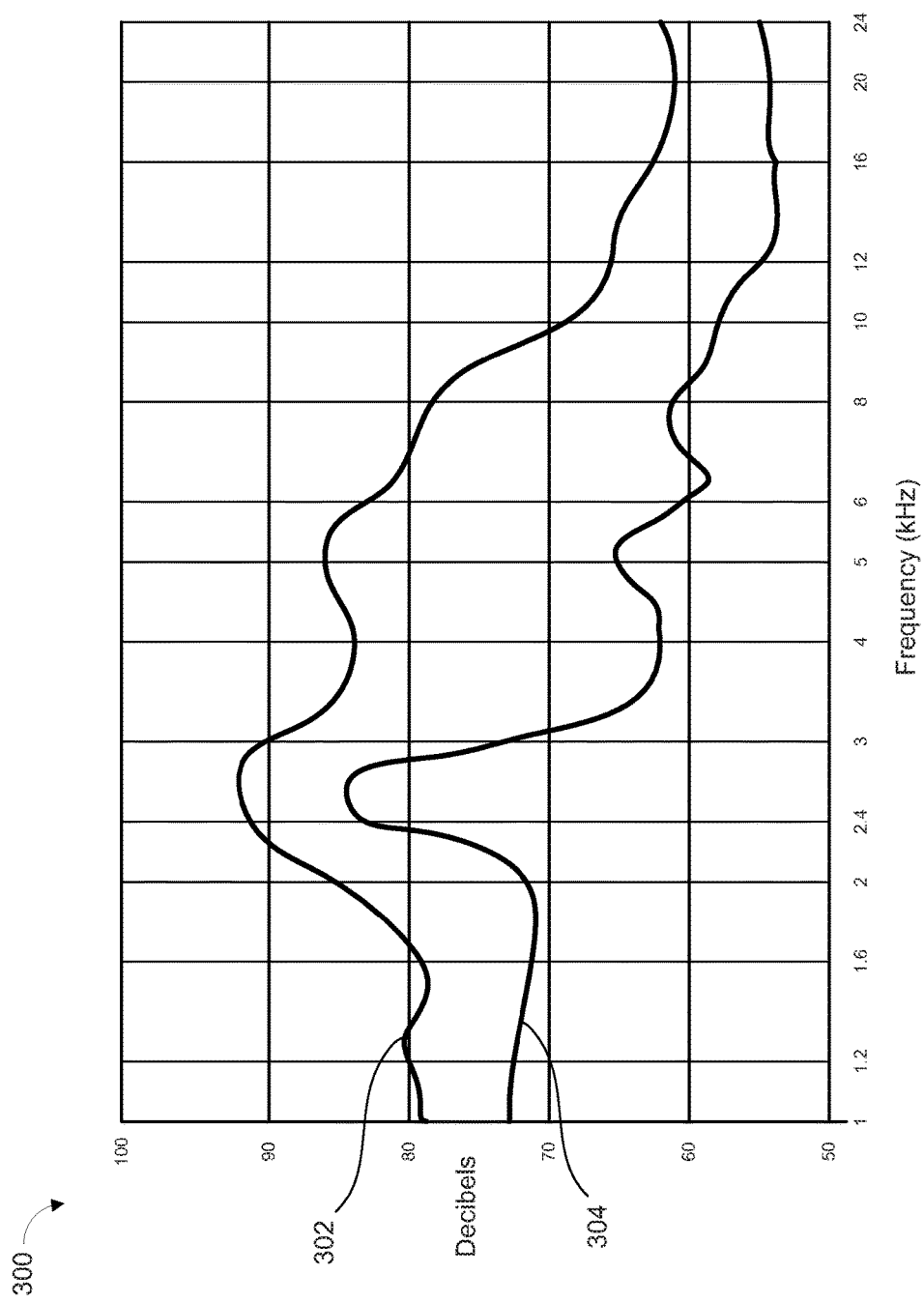
FIG. 3 illustrates a graph showing two example acoustic profiles according to embodiments of the present disclosure.

FIG. 3 illustrates a graph 300 showing two example waveforms of data captured by an accelerometer such as accelerometer 102. Graph 300 illustrates a frequency (in kHz) on the X axis and a decibel level on the Y axis. Waveforms 302 and 304 may be fast Fourier transforms (FFT) of the signal received from the accelerometer.

Waveform 302 may correspond to a worn wiper blade, while waveform 304 corresponds to a new wiper blade. As can be seen, the noise (decibel level) of the warn blade, waveform 302, is measurably higher than the new blade, waveform 304. In addition, the difference is particularly noticeable between 1 to 10 kHz. In some examples, a signal received from the accelerometer may be compared to a baseline signal, and a different between the signals at a particular frequency may be compared to a threshold. In other examples, the signal received from the accelerometer may be compared to a threshold on its own, and if a particular frequency or range of frequencies is greater than the threshold, an alert may be displayed. As such, the threshold may be a threshold difference between a reference signal and a measured signal, between a stored acoustic profile and a determined acoustic profile. Alternatively, the threshold may be an objective value that is not tied to a reference signal. Other comparisons and thresholds may be used as well.

Figure 4:
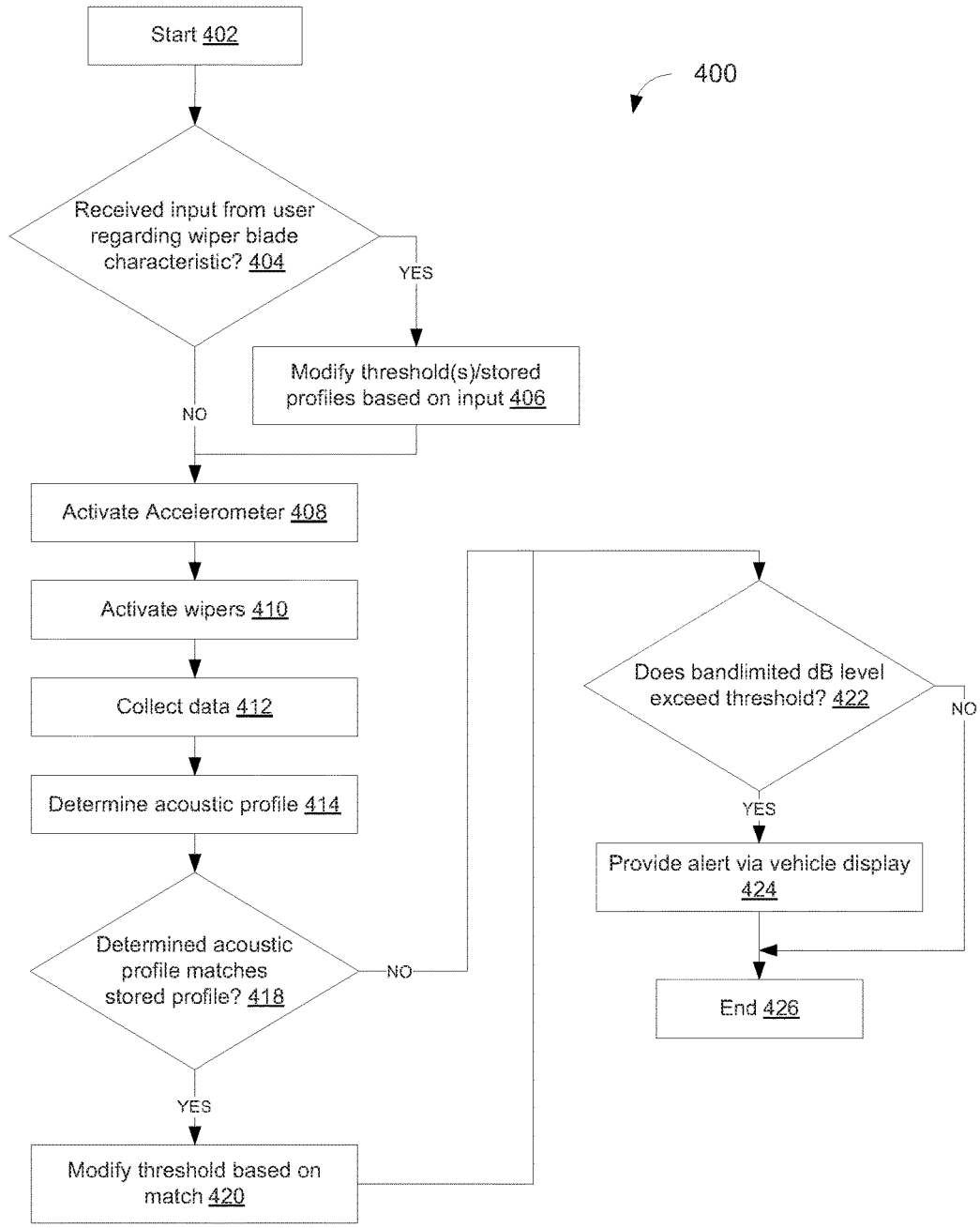
FIG. 4 is a flowchart of a method according to embodiments of the present disclosure.

FIG. 4 illustrates an example method 400 according to embodiments of the present disclosure. Method 400 may enable a vehicle to monitor the health of a windshield wiper through the use of an accelerometer affixed to the window. The flowchart of FIG. 4 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining whether input has been received from a user regarding a wiper blade characteristic. As noted above, various different manufacturers, sizes, and other characteristics of wiper blades may be used, and may affect the acoustic profile and/or other aspects of the present disclosure. If input is received, the processor may modify a threshold or stored profile based on the input at block 406. For instance, the vehicle may have a plurality of stored profiles, each corresponding to a particular wiper blade. If the user inputs the type of wiper blade, the processor may use the threshold corresponding to the profile of the input blade type.

At block 408, method 400 may include activating the accelerometer. This may include turning it on, or otherwise performing one or more actions to allow the accelerometer to operate. At block 410, method 400 may include activating the wipers. This may be done manually by a driver, or may be done automatically based on one or more vehicle sensors detecting rain or water on the windshield.

At block 412, method 400 may include collecting data from the accelerometer and/or one or more other sensors. At block 414, method 400 may include determining an acoustic profile based on the collected data. Determining the acoustic profile may include performing signal processing on the data, and/or filtering the data around a particular frequency or range of frequencies.

At block 418, method 400 may include determining whether the determined acoustic profile matches or has a close match to a stored acoustic profile. As discussed above, the vehicle 100 may store a plurality of acoustic profiles, which may correspond to particular wiper blades or scenarios, such as a broken wiper blade or broken wiper blade arm. If there is a match or similar stored profile, method 400 may include modifying the threshold based on the matched stored acoustic profile. This may include raising or lowering the threshold, or maintaining the same threshold level.

At block 422, method 400 may include determining whether a bandlimited decibel level of the determined acoustic profile exceeds the threshold. This may include determining whether a particular frequency exceeds a threshold level, whether a range of frequencies exceed the threshold, whether an average level of a range of frequencies exceeds a threshold, or some other calculation. If the bandlimited decibel level does not exceed the threshold, method 400 may end at block 426. However if the decibel level does exceed the threshold, that may indicate that the wiper blade is aged, broken, or otherwise needs to be checked out or replaced.

Block 424 of method 400 may include providing an alert via the vehicle display. In some examples, the alert may be based on a matched stored acoustic profile. For instance, where the matched stored profile corresponds to an aged wiper blade, the alert may indicate that the wiper blade is aged. But where the matched stored profile corresponds to a broken wiper blade arm, the alert may indicate that the wiper blade arm is broken and must be replaced. Method 400 may then end at block 426.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    an accelerometer affixed to a vehicle window;
    a windshield wiper to actuate across the vehicle window; and
    a processor configured to:
        determine an acoustic profile corresponding to the windshield wiper based on structure-borne audio data received from the accelerometer;
        determine whether a bandlimited decibel level of the acoustic profile exceeds a threshold; and
        responsively provide an alert via a vehicle display.

2. The vehicle of claim 1, wherein the accelerometer is configured to measure vibrations perpendicular to a glass surface of the vehicle window.

3. The vehicle of claim 1, wherein the accelerometer is affixed to a top-center portion of a front windshield of the vehicle.

4. The vehicle of claim 1, wherein the processor is further configured to:
    compare the determined acoustic profile to a plurality of stored acoustic profiles, wherein each stored acoustic profile has a corresponding threshold;
    determine a closest matching stored acoustic profile; and
    select the threshold corresponding to the closest matching stored acoustic profile.

5. The vehicle of claim 4, wherein a first profile of the plurality of stored acoustic profiles corresponds to an aged wiper blade, and wherein a second profile of the plurality of stored acoustic profiles corresponds to a broken wiper blade arm.

6. The vehicle of claim 4, wherein each stored acoustic profile comprises a corresponding alert type, and wherein the processor is further configured to provide the alert based on the closest matching acoustic profile.

7. The vehicle of claim 1, wherein the bandlimited decibel level comprises a decibel level of the acoustic profile between 1 to 10 kHz.

8. The vehicle of claim 1, wherein the processor is further configured to:
    receive input indicating a characteristic of the windshield wiper; and
    modify the threshold based on the received input.

9. The vehicle of claim 1, wherein the accelerometer comprises a first sensor, and wherein the processor is further configured to:
    receive data from a second sensor; and
    provide the alert via the vehicle display based on data from the first sensor and data from the second sensor.

10. The vehicle of claim 1, further comprising transmitting the alert to a vehicle service center.

11. A method comprising:
    receiving, by a processor, structure-borne audio data captured by an accelerometer affixed to a vehicle window, wherein the audio data corresponds to noise generated when a windshield wiper is actuated across the vehicle window;
    determining an acoustic profile corresponding to the structure-borne audio data;
    determining whether a bandlimited decibel level of the acoustic profile exceeds a threshold; and
    responsively providing an alert via a vehicle display.

12. The method of claim 11, wherein the accelerometer is configured to measure vibrations perpendicular to a glass surface of the vehicle window.

13. The method of claim 11, wherein the vehicle window is a front windshield, and wherein the accelerometer is affixed to a top-center portion of the front windshield.

14. The method of claim 11, further comprising:
    comparing the determined acoustic profile to a plurality of stored acoustic profiles, wherein each stored acoustic profile has a corresponding threshold;
    determining a closest matching stored acoustic profile; and
    selecting the threshold corresponding to the closest matching stored acoustic profile.

15. The method of claim 14, wherein a first profile of the plurality of stored acoustic profiles corresponds to an aged wiper blade, and wherein a second profile of the plurality of stored acoustic profiles corresponds to a broken wiper blade arm.

16. The method of claim 14, wherein each stored acoustic profile comprises a corresponding alert type, the method further comprising providing the alert based on the closest matching acoustic profile.

17. The method of claim 11, wherein the bandlimited decibel level comprises a decibel level of the acoustic profile between 1 to 10 kHz.

18. The method of claim 11, further comprising:
    receiving input indicating a characteristic of the windshield wiper; and
    modifying the threshold based on the received input.

19. The method of claim 11, wherein the accelerometer comprises a first sensor, the method further comprising:
    receiving data from a second sensor; and
    providing the alert via the vehicle display based on data from the first sensor and data from the second sensor.

20. The method of claim 11, further comprising:
    transmitting the alert to a vehicle service center.

* * * * *